United States Patent [19]
Joubert

[11] Patent Number: 4,804,402
[45] Date of Patent: Feb. 14, 1989

[54] PREPARATION OF NATURAL FERTILIZING MATERIAL

[76] Inventor: Arthur P. Joubert, P O Box 3, Koelenhof, 7605, South Africa

[21] Appl. No.: 40,763

[22] Filed: Apr. 16, 1987

Related U.S. Application Data

[63] Continuation of Ser. No. 821,492, Jan. 22, 1986, abandoned, which is a continuation of Ser. No. 315,576, Oct. 27, 1981, abandoned.

[51] Int. Cl.$^4$ .............................. C05F 7/00; C05F 3/00
[52] U.S. Cl. ........................................ 71/12; 71/13; 71/27; 71/903; 71/904
[58] Field of Search .................. 71/9, 12, 13, 27, 903, 71/904

[56] References Cited

U.S. PATENT DOCUMENTS

| | | | |
|---|---|---|---|
| 3,445,383 | 5/1969 | Horvath | 210/755 |
| 4,056,380 | 11/1977 | Thiac | 71/903 X |
| 4,280,656 | 4/1986 | Cohen et al. | 426/331 |

OTHER PUBLICATIONS

Enigk et al (Enigk), Zentrablatt fuer Bakteriologie Abt 1, Origionale, vol. 179, pp. 397-432 (1960).

Primary Examiner—Ferris H. Lander
Attorney, Agent, or Firm—Ladas & Parry

[57] ABSTRACT

A method and plant are provided for sterilizing waste sewage sludge with methyl bromide vapor, to produce a natural fertilizing material. The moisture content of the sludge is reduced to a level where the vapor permeability of the sludge is sufficiently high to reduce the contact period of the methyl bromide vapor with the sludge to an economically viable level. The methyl bromide is provided at a dose of at least 50 g/m$^3$ to the top of a bed of sewage sludge having a moisture content of less than 35% and about 1 meter thick and allowed to permeate the bed over a period of about 48 hours under the force of gravity, the bed of sewage sludge being covered during the entire treatment period with a cover which is impermeable to the methyl bromide vapor. Harmful pathogens and parasites such as *Ascaris ova* are effectively eliminated.

6 Claims, 2 Drawing Sheets

PREPARATION OF NATURAL FERTILIZING MATERIAL

This is a continuation of co-pending application Ser. No. 821,492 filed on Jan. 22, 1986 and now abandoned which is a continuation in part of Ser. No. 315,576 filed on Oct. 27, 1981 now abandoned.

BACKGROUND OF THE INVENTION

1. Field of the Invention

This invention relates to the preparation of a natural fertilising material. More particularly, this invention relates to a method and a plant for preparing an essentially sterile fertilising material from waste sewage sludge.

It is well known that before waste sewage sludge can be used for agricultural or horticultural purposes, essentially complete sterilisation of such sludge is required because of the particular contents of the sludge, which may contain parasites, viruses, bacteria, and the like. Without some or other sterilisation process being applied to the sludge, the danger of propagation of and/or subsequent contamination and infection by parasites and disease precludes the free use of such sludge for agricultural or horticultural purposes.

Since human faeces carry virtually all human and animal infections and parasites, it is a prerequisite for the substantially unrestricted use of such a natural fertilising material in agricultural or horticultural applications that the sludge is suitably treated by a sterilisation process in order to produce a safe fertilising material.

2. Description of Related Art

It is known to those skilled in the art that waste sewage sludge is often matured after treatment thereof in a sewage plant for sterilisation purposes. Such maturation is carried out either by leaving a pile of waste sewage sludge exposed, in which case fungus may form on the surface thereof; or a pile of sewage sludge may be placed under a layer of, for example, grass sods, in which case natural processes lead to the generation of heat in the pile of sludge. Both these maturation processes usually take several weeks before the sludge may be recognised as being suitable for use as a natural fertilising material. Whilst these natural processes take a considerable period, which is a disadvantage in terms of throughput or production of such natural fertilising material, these processes do not invariably rid the sludge of undesiragble parasites, viruses, bacteria, and the like, and give rise to the loss of nitrogen due to volatilisation, which results in a lower nutrient value in the product.

In contrast to the above natural methods, it is also known to those skilled in the art that sewage effluent may be treated by means of exposure to chlorine gas, the sludge in this case being in suspension, i.e. at a very high moisture content. Such methods, and for example filtration followed by break-point chlorination, can clearly not be applied to sludge. It has been reported that even such treatment cannot guarantee inactivation of all the organisms present.

U.S. Pat. No. 3,445,383, dated May 20, 1969, to Roland J. Horvath et al. teaches a process for treating sewage effluent with chlorinated glycolurils in order to achieve slow release of chlorine to provide long term disinfection of sewage effluent. Essentially, however, this amounts to treatment of sewage effluent with chlorine, and this method, as pointed out above, cannot guarantee a sterile product.

In 1975, Smith, Young and Dean (Water Research, Vol. 9, pp. 17–24) proposed a process of aerobic thermophyllic digestion, or so-called "wet composting", to sterilise sewage sludge, but the method does not seem to have been widely adopted, probably because of its high cost.

The presently accepted methods for ensuring the destruction of pathogens present in sludge usually involve the application of heat. It is generally accepted that *Ascaris ova*, considered to be the most resistant of the organisms present in sewage and therefore an indicator of the efficacy of a treatment method, are destroyed when subjected to a temperature of at least 60° for a minimum period of 30 minutes (B.D. Hays, Water Research, Vol. 11, pp. 583–95, 1977). In Germany and Switzerland, sludge intended for land application is generally treated in this manner; use of such heat sterilisation is, however, considered too expensive a procedure for most other countries. As a result, large quantities of sewage sludge infected by pathogens have been accumulating in many countries, particularly on the fringes of urban areas, where they constitute a continuous health hazard, without their soil nutritional values being utilised.

Another recently developed technique which is currently applied for the sterilisation of sewage effluent and of sludge is the process of radiation, which involves particularly the use of gamma rays or of electrons of relatively low energy (i.e. velocity). Plants using gamma ray sterilisation are generally very expensive and have a modest throughput.

Methyl bromide has been used routinely over many years for fumigating soils prior to the planting of crops sensitive to insect pests and organisms such as nematodes, or in the preparation of seedbeds. In such applications the methyl bromide is injected into the soil under an impervious cover (to prevent escape of the methyl bromide into the atmosphere) at ambient temperature in the form of the liquid and/or as the vapor.

In the United States Department of Agriculture Publication No. E-838 entitled "Methyl bromide fumigation of cotton seed in freight cars for the destruction of pink bollworms" by G.L. Philips the use of methyl bromide vapor is discussed for killing pink bollworm larvae embedded in cotton seed when exposed to moderate concentrations of methyl bromide. In U.S. Pat. No. 4,200,656, Cohen et al describe a method for fumigating grain stored in bins by a gravity penetration method comprising applying a mixture of carbon dioxide and methyl bromide. All insects were killed throughout the total depth of the bin. In a control experiment using methyl bromide alone, only insects in the upper part of the bin were killed.

The fumigation techniques taught by these references, however, fall short of sterilisation, i.e. they do not mention *Ascaris ova* nor do they suggest that they could be effective against *Ascaris ova*.

In the Textbook of Parasitology by David L. Belding (third edition), on pages 468 and 469, mention is made that *Ascaris* and *Toxocara* ova in infested soils are killed by the use of free iodine, and green or root vegetables from gardens fertilised by night soil can be safely used after treatment with free iodine. It is also stated that treatment of infested soil by means of agricultural and other chemicals, for example chlorthion and isochlorthion, is claimed to kill the ova.

Belding (on p. 469 of his book) quotes K. Enigk and J. Eckers (Zentralbl. Bakt. Abt. 1 Orig. Volume 179, pp. 397 –432, 1960) as having found that "gaseous dibromethane" "rapidly" kills *Ascaris ova* in soil. Of course, there is no compound known in English by this name. Reference to the original paper by Enigk and Eckers shows that, while the English Summary accompanying the paper uses the term "dibromethan", the compound should correctly have been translated from the German text as dibromoethane. Belding therefore used a wrong term, which we repeated unchanged in the specification of our prior copending U.S. application Ser. No. 315,567, now abandoned, and which we interpreted at the time as meaning dibromomethane.

In their experiments Enigk and Eckers sprayed the liquid dibromoethane (of boiling point 131,4° C.) by means of a garden insecticide spray on to the surface of experimental patches of soil which were artificially infected with *Ascaris ova*. At soil temperatures of 20°-21° C. the application of 100–200 ml/m$^2$ of surface area of this compound produced essentially complete eradication of *Ascaris ova* up to a depth of 20 cm, but at lower soil temperatures and/or application rates the efficacy of the treatment was considerably reduced.

Although Belding in his book makes no reference to it, we have now noted that the Enigk & Eckers paper also reports experiments (aimed at finding an effective disinfectant to destroy *Ascaris ova* in soil) with pressurised liquid methyl bromide, applied to the top of the experimental patch of soil through a small number of pipe nipples located in an impervious cover placed over the soil. The authors report that methyl bromide was tested on surfaces of 25 to 45 m$^2$ in quantities of 22,2 to 44,4 ml/m$^2$, but showed no reliable effect in that the *Ascaris ova* were killed only in the immediate vicinity of the nipples, whereas in positions some distance away from the nipples the effect was small or the treatment failed completely.

Thus these references teach that the use of organic bromo compounds such as dibromoethane and methyl bromide as a means of killing *Ascaris ova* in soils, will meet with limited success. Efficient eradication was observed only up to a few centimeters deep from the surface of the soil, and in some cases only in the vicinity of the point of application of the chemical. In fact, Enigk and Eckers teach away from the invention, in that they specifically state dibromoethane to be more successful in eradicating *Ascaris ova* than methyl bromide, and in that they teach that methyl bromide "showed no reliable effect" (cf their English Summary on p. 427 of the paper). We now suspect that the failure of their experiments to produce more reliable results with methyl bromide is almost certainly due to the fact that they applied the methyl bromide, at least partially, in the form of the liquid directly from the pressurised container, as would appear to be suggested by the photograph appearing on p. 405 of their paper, which has the caption : "Abb. 1 Desinfektion des Erdbodens mit Methylbromide. Das Methylbromid stroemt aus einer Stahlflasche durch einen Einfullstutzen unter die Kunststoffplane", which may be translated as: "FIG. 1. Disinfection of the ground with methyl bromide. The methyl bromide flows out of a steel bottle through a filling nipple under the plastics cover. " The fact that they express the amounts of methyl bromide applied per m$^2$ of ground in millilitres further corroborates this interpretation. It is suggested by the applicant, with the benefit of hindsight derived from his own invention, that the methyl bromide, when applied in this manner, would fully permeate the surface of the ground before it could spread laterally to achieve a uniform distribution in the horizontal plane. Dibromoethane, because of its high boiling point, can only practically be applied by spraying the liquid; the high boiling point also makes it safe to do so without a cover (in contrast to methyl bromide), making it possible to observe the application of the chemical and ensure that it is uniformly applied.

The results of Enigk and Eckers are, in any case, not applicable to the treatment of sewage sludge, as it is not obvious whether the organic bromo compound vapor would produce a similar degree of penetration in the sewage sludge compared to soil, having regard to the differences in particle size, density, compaction and moisture content of the two materials.

Despite the great need for an efficient treatment method of reasonable cost that will eradicate *Ascaris ova* in sewage sludge, thereby to effectively sterilise the sludge, and thus to make it available as a natural fertiliser material, the use of methyl bromide has not been reported.

SUMMARY OF THE INVENTION

Applicant has now surprisingly found, directly contrary to the teachings of the prior art concerning the eradication of *Ascaris ova* in soils, that *Ascaris ova* can be effectively eradicated in sewage sludge, thereby essentially sterilising said sewage sludge, by applying heated methyl bromide in the form of a vapor to the top of a bed of sewage sludge preferably not exceeding about 1 meter in depth and covered by a sheet or cover which is impervious to the vapor, by allowing said vapor to permeate the bed of sewage sludge under the force of gravity over a period of approximately 48 hours, provided the moisture content of the sewage sludge does not exceed about 35 percent by mass. (The term "vapor" used in this specification is to be taken as having the strict scientific meaning of a clear gas, free of droplets of liquid, i.e. consisting of the gaseous phase only.)

According to the invention there is provided a method of preparing natural fertilising material, including the step of contacting waste sewage sludge, having a relatively reduced moisture content, with methyl bromide, applied in the form of vapor, for a period sufficient to effectively sterilise the sludge, thereby producing a natural fertilising material from the sewage sludge.

The expression "relatively reduced moisture content" when used herein means that the waste sewage sludge is readily or sufficiently permeable by the vapor. In practice the upper limit to the moisture content satisfying these requirements has been found to be approximately 35%.

The method includes the steps of introducing the vapor at the top of a body of sewage sludge to be treated and permitting the vapor to permeate the body of sewage sludge downwardly under the force of gravity.

A supply of pressurised liquid methyl bromide may be provided from which methyl bromide vapor is drawn off. Preferably the methyl bromide liquid is heated so as rapidly to convert the pressurised methyl bromide liquid into vapor, which is contacted with the sewage sludge. In the preferred embodiment the methyl bromide vapor is almost invariably hot. The term "hot" must here be broadly defined. Preferably it is meant to describe the temperature of the methyl bromide vapor issuing from a pipe manifold connected to a heating coil, the other end of the coil being connected to a pressurised supply of liquid methyl bromide, and the coil being immersed in a bath of hot liquid, preferably boiling water. Depending on the length of the heating coil, the temperature of the liquid which covers the heating coil, ambient conditions, the position of an orifice on the pipe manifold, etc., the temperature of the methyl bromide vapor issuing from an orifice in the pipe manifold may be between 100° and ambient temperature, preferably between 95° and 40° C. Of course, if so desired, yet a higher temperature may be ensured by using a nonaqueous liquid in the heating bath which has a boiling point substantially higher than that of water. Examples of such liquids are high-boiling oil fractions, glycerine and high molecular-weight organic esters.

It is an important feature of the invention that the methyl bromide is fully vaporised at the heater, i.e. all the necessary latent heat of vaporisation is supplied here, and the vapor is distributed through the pipe system or manifold(s) from whence it issues from orifices freely (i.e. not sprayed from nipples) at a sub-critical pressure drop. This assures that there will be no condensation (due to adiabatic cooling associated with a super-critical pressure drop), and hence lateral distribution before penetration of the bed.

The minimum amount of methyl bromide required for effective sterilisation during the minimum treatment period indicated is about 50 grams per cubic meter of sludge. In practice, the higher the moisture content of the sludge and the lower the ambient temperature, the larger the amount of methyl bromide and/or the longer the treatment period required. Since the cost of the methyl bromide constitutes only a modest proportion of the overall cost of preparing the natural fertilising material, a larger amount of methyl bromide, for example 100 to 200 $g/m^3$, preferably 100 to 400 $g/m^3$, can be utilised to assure complete sterilisation.

The method may include the step of providing the sewage sludge in a trough spread into the form of a bed, preferably by means of a suitable conveyor means.

The method may include the step of removing the sewage sludge after sterilisation thereof from the trough by means comprising a worm conveyor.

The bed may have a thickness not exceeding about 2 meters, preferably being about 1 to 2 meters, more particularly being about 1 meter.

The method may further include the step of first reducing the moisture content of the sewage sludge to less than about 35% before contacting it with methyl bromide vapor. The reason for this is that if the sludge has a moisture content higher than about 35%, the gas permeability thereof decreases substantially with increasing moisture content, and any vapor permeation or diffusion process may take considerably longer, and/or a considerably larger amount of methyl bromide may be required, to achieve a satisfactory sterilisation of the sewage sludge.

The contact period of the methyl bromide vapor with the sewage sludge may be between 36 and 72 hours, being preferably about 48 hours.

If the moisture content of the sewage sludge is considerably lower than 35%, the contact time may be proportionally less than 48 hours.

The method includes the step of providing a layer or sheet of impervious material sealably above a sewage sludge body, for the duration of a treatment cycle, and introducing the methyl bromide vapor in a gas-tight manner to the space between the layer of impervious material and the body of sewage sludge.

Also according to the invention, there is provided a plant for preparing natural fertilising material, comprising at least one trough adapted for receiving waste sewage sludge to be sterilised, a methyl bromide vapor supply, and a pipe system connected to the methyl bromide vapor supply and located above the bed and adapted to introduce to and suitably contact waste sewage sludge when received in the or each trough with the methyl bromide vapor.

The plant includes an impermeable cover sheet provided sealably over the or each bed and enclosing the pipe system, to prevent escape of the methyl bromide vapor to the atmosphere.

The plant may include heating means adapted to vaporise pressurised methyl bromide liquid and to supply the methyl bromide in the form of vapor to the or each bed.

It is possible to take off methyl bromide vapor directly from a pressured container, i.e. without converting the liquid into vapor by means of a heated coil, but in such a case the vapor becomes cooled to substantially below the ambient temperature, because of the take-up of heat from the environment to supply the heat of vaporisation of the liquid methyl bromide. Such cooled methyl bromide vapor may possibly not spread laterally as uniformly as hot vapor, to cover the entire surface area of the bed of sewage sludge, in the initial stages of the treatment cycle entailing the risk that those portions of the bed surface furthest away from the inlet openings may not receive the desired dose of methyl bromide vapor, hence leading to incomplete sterilisation of portions of the bed of sewage sludge. Such a risk is greatest when the ambient temperature is relatively low, the moisture content of the sludge is relatively high, and the dose of methyl bromide is below 100 $g/m^3$. Vaporisation of the methyl bromide in a heated coil in accordance with the preferred embodiment of the invention not only minimises this risk, but speeds up application of the methyl bromide vapor to the top of the bed of sewage sludge.

Since methyl bromide vapor, which is essentially odorless, is dangerous to humans and animals, it is preferable to use a blend of 98% methyl bromide and 2% chloropicrine, as is known in the art. This latter compound has an extremely pungent smell, which therefore acts as a safety factor in alerting a worker to a possible leak of methyl bromide vapor.

The methyl bromide sterilising fluid may also include one or more volatile compounds which together provide a broader sterilisation spectrum or an intensified sterilisation effect. Thus the methyl bromide may contain for example any other known volatile sterilising compound, for example a germicide, an insecticide, and/or an acaricide, applied together with the methyl bromide or separately therefrom.

The heating means may comprise a heating gas supply, a gas burner and a water bath located operatively above the gas burner, the water bath having located therein a heating coil for vaporising the methyl bromide liquid, the heating coil being connected at its one end to the supply of methyl bromide liquid and at its other end to the pipe system.

The pipe manifold may be upwardly hingeable to permit filling of the or each trough with sewage sludge and optionally to permit removal of the sewage sludge after sterilisation thereof.

The plant may include suitable sludge handling equipment for filling the or each trough with sewage sludge prior to the sewage sludge being contacted with the methyl bromide vapor, and optionally for removal of sterilised sewage sludge. The sludge handling equipment may include at least one conveyor belt for filling the or each trough with sewage sludge. Preferably the conveyor belt is a roving conveyor belt. The base of the trough may be wedge-shaped and a conveyor worm may be located at the base thereof for removal of sewage sludge after sterilisation thereof.

The or each bed of sewage sludge may have a depth not exceeding about 2 meters, being preferably about 1 to 2 meters, more particularly about 1 meter. The or each trough may have any convenient width and length. A trough accommodating a bed of sewage sludge of dimensions 50 meters long by 6 meters wide by 1 meter deep is typically a convenient size.

BRIEF DESCRIPTION OF THE DRAWINGS

The invention will now be described, by way of example, with reference to the following drawings, in which.

DETAILED DESCRIPTION OF THE INVENTION

Figure 1:
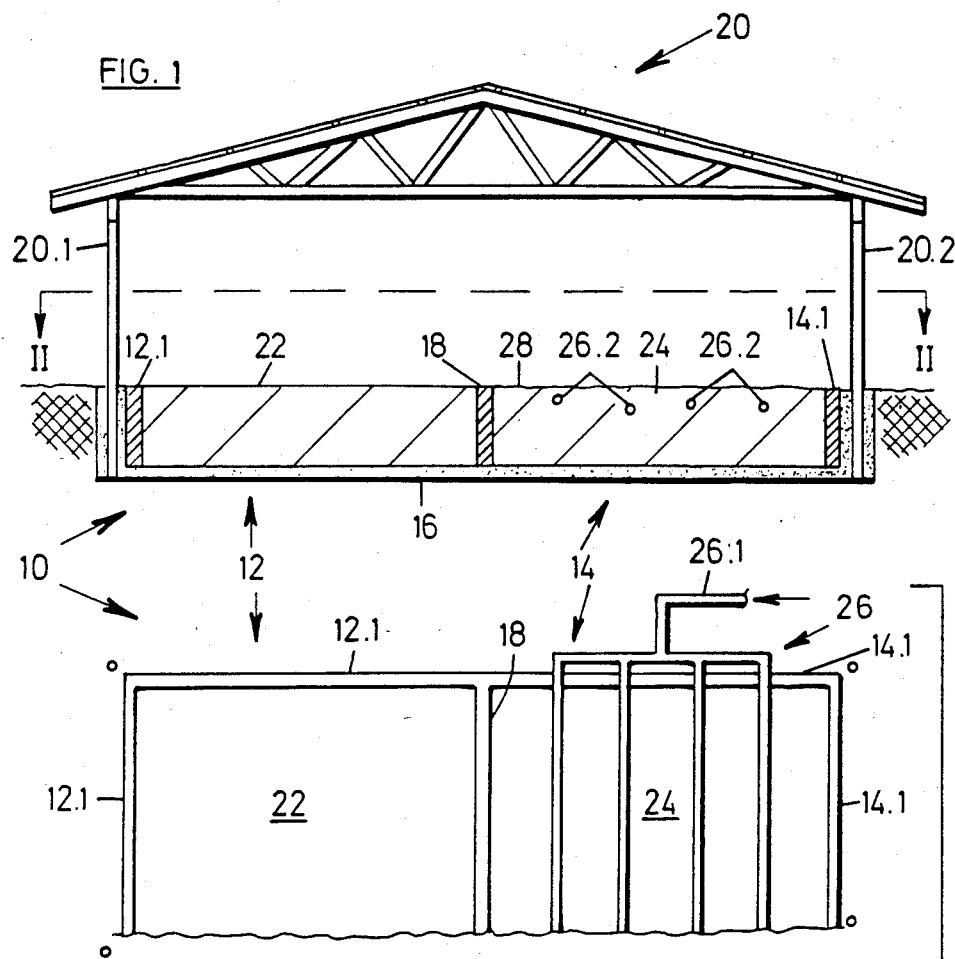
FIG. 1 shows a side sectional view of a plant for producing natural fertilising material, in accordance with the invention.
Figure 2:
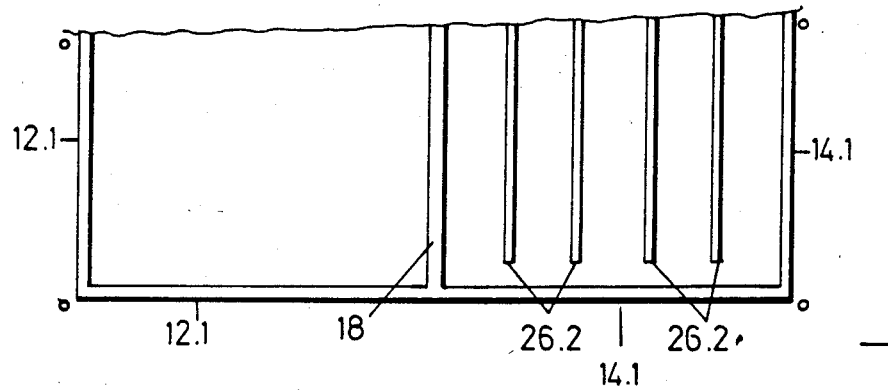
FIG. 2 shows a partial sectional plan view on the section line II—II of the plant shown in FIG. 1.

Referring firstly to FIGS. 1 and 2, reference numeral 10 refers generally to a plant for producing natural fertilising material according to the invention. The plant 10 comprises two troughs 12 and 14 respectively located adjacent each other and constructed of a common concrete floor slab 16, and brick and mortar dividing wall 18.

The troughs 12 and 14 are covered by a weather-proof roof covering 20 supported by a plurality of supports 20.1, 20.2 suitably anchored in concrete footings in the ground, as shown in FIG. 1.

The troughs 12 and 14 ae shown filled with beds of sewage sludge 22 and 24 respectively. The trough 14 has a pipe manifold 26 located at or near the top of the trough 14.

The inlet 26.1 of the manifold 26 is connected to a methyl bromide vapor supply (to be discussed more fully hereunder) and each branch member or pipe 26.2 is blanked off at its free end, and has a plurality of spaced openings (or orifices) therein (not shown) for permitting introduction of the methyl bromide vapor from the manifold 26 to the top of the bed of sewage sludge 24.

The bed of sewage sludge 22 in the trough 12 has already been sterilised, and the troughs 12 and 14 are used in rotation to ensure a more or less steady production rate.

The manifold inlet 26.1 may be attached to the methyl bromide liquid supply (not shown) by a swivel joint (also not shown) to enable the manifold 26 to be hinged upwardly from the trough 14 to permit ready loading of sewage sludge into the trough 14 for sterilisation thereof.

A conveyor belt (not shown), preferably of the roving type, may be provided for transport of matured sewage sludge from for example an adjacently located sewage works to the plant, and more specifically to the troughs 12 and 14. Naturally the plant may comprise a plurality of troughs 12 and 14, depending upon production requirements.

Whilst the troughs 12 and 14 have the particular shape shown by the section in FIG. 1, each trough may be provided with a wedge-shaped base and a conveyor worm located at the base of the wedge for removal of sterilised sewage sludge.

The depth of each trough 12, 14 is approximately one meter.

An impermeable cover sheet in the form of a plastics sheet 28 is provided over the bed of sewage sludge 24 in trough 14 to prevent escape of methyl bromide vapor to the atmosphere. The plastics sheet 28 is therefore sealed along all four of its sides to the trough 14.

Figure 3:
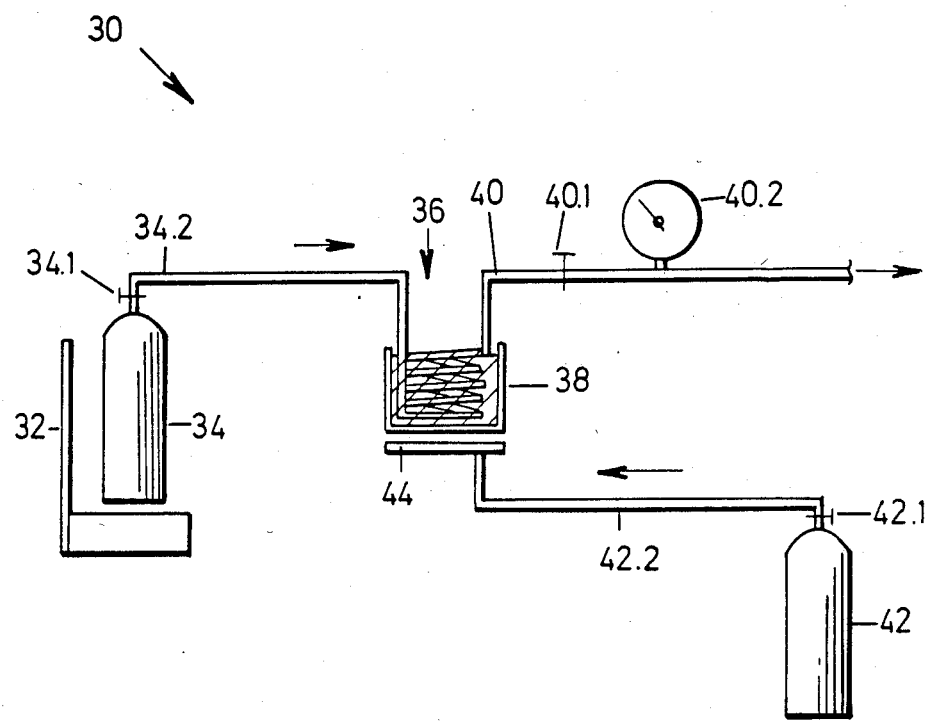
FIG. 3 shows a schematic diagram of a methyl bromide vapor supply layout for the plant shown in FIGS. 1 and 2.

Referring now to FIG. 3, reference numeral 30 refers generally to a pressurised methyl bromide liquid supply which may be used in conjunction with the plant 10 and which may be considered as a part thereof.

The sterilising fluid supply 30 comprises a scale 32 which may be used for weighing a cylinder 34 of liquid methyl bromide from time to time. The cylinder 34 has a supply valve 34.1 to which is connected a pipe 34.2 which in turn is connected to a heating coil 36 located in a water tank 38. The opposite end of the coil 36 is in turn connected to a pipe 40 having a control valve 40.1 therein, as well as a pressure gauge 40.2. The pipe 40 then continues and is connected to the inlet 26.1 of the manifold 26, as explained above.

A cylinder 42 of heating gas is connected via a supply valve 42.1 and a supply pipe 42.2 to a burner 44 located below the water tank 38 for heating the water in the tank 38.

In use the plant is operated as follows:

Waste sewage sludge from a sewage works that has received the conventional sewage treatment, and which is otherwise considered to be a sewage end product, is dried by any conventional means or allowed to dry naturally, if required, until a moisture content of less than approximately 35% has been attained in the sludge.

The sewage sludge, if or when sufficiently dry, is transported to and loaded into the trough 14 as shown in FIG. 1 preferably by means of a conveyor (not shown), to form a bed 24. Sludge 22 in trough 12 has already been sterilised, and the sterilised sewage sludge 22 therein is awaiting removal.

The pipe manifold 26 is then positioned as shown in FIG. 1, and the manifold pipe 26.1 is connected to the methyl bromide vapor supply pipe 40.

During loading of the sewage sludge 24 into the trough 14, the manifold 26 may conveniently be swung hingeably and upwardly away from the trough 14. When the trough 14 has been filled with sewage sludge 24, the manifold 26 is lowered so that it is positioned on top of the bed 24, as shown in FIG. 1.

Conveniently the belt conveyor, mentioned above, is used for transporting and loading the sludge into the troughs 12, 14.

A suitable plastics sheet 28 is then placed over the bed 24, as shown in FIG. 1, so that the trough 14 and bed 24 are effectively sealed in a gas-tight fashion.

With the manifold part 26.1 connected to the methyl bromide supply pipe 40, the supply valve 42.1 on the heating gas supply cylinder 42 is opened and the burner 44 is lit. The heating gas flows along the pipe 42.2 and is ignited outside the burner 44, thereby heating the water in the water tank 38, preferably to boiling.

The control valve 34.1 on the methyl bromide cylinder 34 is then opened, and methyl bromide liquid is allowed to flow along the pipe 34.2 into the heating coil 36 where under the influence of the hot or preferably boiling water in the water tank 38 the methyl bromide liquid is vaporised and converted into vapor. The methyl bromide vapor then flows along the pipe 40, and when the control valve 40.1 is opened, the methyl bromide vapor flows along the pipe 40 into the manifold pipe 26.1, and into the branch pipes 26.2 where the methyl bromide vapor escapes from the branch pipes 26.2 via the openings provided therein (not shown). Since methyl bromide vapor at all temperatures from ambient to 100° C. has a density greater than air, the vapor tends under the influence of gravity to permeate or diffuse downwardly through the body of sewage sludge 24. Since the trough 14 and bed 24 are effectively sealed in a gas-tight fashion, the methyl bromide vapor cannot readily escape therefrom.

The branch pipes 26.2 are made up, for example, of suitable plastics piping having a diameter of about 50 to 60 mm. The holes therein are about 4 to 5 mm in diameter and are provided about every 150 mm along the length of each branch pipe 26.2. To account for the Bernoulli effect, the size of the holes are progressively increased along the length of a pipe towards the blanked off end.

After the contact period the plastics sheet 28 is removed, the pipe manifold 26 hinged upwardly away from the trough 14, and the sterilised sewage sludge 24 removed from the trough 14. By that time, the already sterilised sewage sludge 22 in the trough 12 would have been removed and the trough 12 would be refilled by another batch of sewage sludge to be treated. The troughs 12 and 14 are therefore used in rotation to ensure a more or less steady supply of sterilised sewage sludge.

EXAMPLES

It has been found by the inventor that methyl bromide, when introduced to the bed in the form of vapor in accordance with the invention, surprisingly effectively destroys viruses, parasites, bacteria and other micro-organisms which occur ordinarily in sewage sludge.

In the examples below, different batches of sewage sludge, each filling a trough having a depth of approximately one meter, a width of six meters and a length of fifty meters, were treated using varying quantities of hot methyl bromide vapor and treatment periods of varying duration. The ambient temperature during these runs varied between about 15° and 30°. The microbiological analyses reported below were carried out by the Cape Regional Laboratory of the National Institute for Water Research of the South African Council for Scientific and Industrial Research in Bellville, Cape Town, whose representatives were present during the conduct of the experiments and who also carried out the sampling.

Table 1 records the results of the microbiological analyses of sewage sludge at Scottsdene Sewage Works, Kraaifontein, near Cape Town, before and after the treatment. The treatment was carried out in June 1980.

Table 2 reports further results, obtained in early 1984, for treatment runs with sewage sludge at the Scottsdene Sewage Works, as well as at at the sewage works of Upington, in the Northern Cape Province. Representative random samples were taken in each case according to established sampling techniques. In each case the methyl bromide liquid was volatilised and heated by immersing coil 36 in boiling water.

The results show that, in the Scottsdene plant, all Salmonella and viable *Ascaris ova* were eradicated at all the values of moisture content tested. At the Upington plant, an application rate of 100 g/m$^3$ of hot methyl bromide vapor destroyed all *E. coli,* colifage and Salmonella in the sewage sludge.

The treated sewage sludge obtained in the earlier run at Scottsdene analysed as follows:

| | |
|---|---|
| % N 4,4 | % Loss on ignition 58.5 |
| % P 1,0 | pH 5,9 |
| % K 1,1 | % Na 0,11 |
| % Moisture 34,0 | | showing it to be a useful natural fertilising material of high plant nutrient content.

Naturally in this specification and claims when mention is made of effective sterilisation, this implies that sterilisation is effected not necessarily totally but to a degree acceptable, for example by local health authorities, for application of such fertilising material for agricultural and/or horticultural purposes.

Routine or spot bacterial and other testing may be carried out on the sewage sludge either during or after sterilisation, and such testing may form part of the sterilisation method.

Although certain embodiments of the invention have been described above, it will be readily apparent to those skilled in the art that the scope of the invention is not to be considered limited by these embodiments, and that there are numerous variants and modifications of the invention possible which fall within the scope of the following claims.

TABLE 1

Results of microbiological examination of untreated and treated sewage sludge at Scottsdene Sewage Works on 17th June 1980.
Dose: 50 g of methyl bromide per cubic meter
Time of treatment (duration): 48 hours

| Sample | Coliforms (37°) per g dry material | Confirmed E. coli (44°) per dry material | Viable Ascaris ova per 100 counted | Colifage per 10 g dry material |
|---|---|---|---|---|
| 1. Untreated dried activated sludge | $3.4 \times 10^8$ | $4.9 \times 10^7$ | 6 | $4.2 \times 10^4$ |
| 2. Treated sludge (sampling point - North) | $8.1 \times 10^6$ | 0 | 0 | 0 |
| 3. Treated sludge (sampling point - middle) | $9.8 \times 10^6$ | 0 | 0 | 0 |
| 4. Treated sludge (sampling point - South) | $8.4 \times 10^6$ | 0 | 0 | 0 |

TABLE 2

Results of Microbiological Examination of Untreated (control) and Treated Sewage Sludge at Scottsdene and Upington Sewage Works, during first quarter of 1984

| Sample No. | Sample Description | MeBr# dose (g/m³) | Duration of Treatment (h) | Moisture Content (%) | Total Coliforms (37° C.) (per 100 g) dry) | E. Coli (per 100 g dry) | Colifage (per 100 g dry) | Salmonella (qualitatively) | ASCARIS OVA (per 100 g dry) Viable | Non-Viable |
|---|---|---|---|---|---|---|---|---|---|---|
| S1* | Control | — | — | — | $4.6 \times 10^8$ | 0 | 0 | + | 84 | 636 |
| S2 | Pile 1 | 200 | 72 | 22.1 | $3.3 \times 10^8$ | 0 | 0 | — | 0 | 114 |
| S3 | Pile 2 | 200 | 72 | 35.4 | $6.4 \times 10^9$ | 0 | 0 | — | 0 | 191 |
| S4 | Pile 3 | 200 | 72 | 42.7 | $4.1 \times 10^9$ | 0 | 0 | — | 0 | 998 |
| S5 | Pile 4 | 200 | 72 | 28.5 | $7.0 \times 10^9$ | 0 | 0 | — | 0 | 128 |
| S6 | Pile 5 | 200 | 72 | 17.1 | $2.2 \times 19^9$ | 0 | 0 | — | 0 | 562 |
| U1** | Control | — | — | — | $5.0 \times 10^6$ | $1.0 \times 10^6$ | $3.6 \times 10^4$ | + | 0 | 0 |
| U2 | Batch 1 | 50 | 48 | 9.6 | $2.0 \times 10^6$ | $1.0 \times 10^5$ | $2.1 \times 10^2$ | + | 0 | 0 |
| U3 | Batch 2 | 100 | 48 | 8.9 | $4.0 \times 10^6$ | 0 | 0 | — | 0 | 0 |

*S = Scottsdene sludge
**U = Upington Sludge
# = Methyl bromide

What is claimed is:

1. A method of preparing natural fertiliser material from waste sewage sludge consisting essentially of the steps of preparing said sewage sludge having a moisture content of less than about 35 percent by weight into a bed of depth less than about 2 meters, and contacting the sewage sludge with at least 50 grams per cubic meter of sewage sludge of a sterilising fluid comprising methyl bromide vapor for a period of between 36 and 72 hours, said step of contacting the sewage sludge comprising arranging an impervious cover in a sealed fashion above the sludge bed, drawing off and heating methyl bromide from a pressurised container so as to completely vaporise it, distributing the methyl bromide in vaporous form and introducing the vapor to the top surface of the bed under the cover without increasing the pressure under said cover to any substantial extent, permitting said vapor to disperse over the the surface of the sewage sludge, and to permeate said bed of sewage sludge downwardly under the influence of the force of gravity, thereby effectively sterilising said sludge and making it fit for use as a natural fertilising material in agricultural and horticultural applications.

2. A method as claimed in claim 1, wherein the bed of sewage sludge has a depth of about 1 meter.

3. A method as claimed in claim 1, wherein the amount of methyl bromide applied to the bed of sewage sludge is 100 to 400 grams per cubic meter of sludge.

4. A method as claimed in claim 1, wherein the duration of the contacting of the bed of sewage sludge with methyl bromide is about 48 hours.

5. A method as claimed in claim 1, wherein the sterilising fluid comprises methyl bromide provided in liquid form in a pressurised container, and the method includes the step of heating the methyl bromide liquid to convert the amount of liquid used in the contacting cycle completely into the vapor form, distributing the methyl bromide in a pipe and manifold system and allowing the vapor to issue from orifices in the system freely with sub-critical pressure drop.

6. A method as claimed in claim 5, wherein the vapor is at the same time heated to a temperature of between ambient temperature and 100° C.

* * * * *